US010165053B2

(12) United States Patent
Fujiwara et al.

(10) Patent No.: US 10,165,053 B2
(45) Date of Patent: Dec. 25, 2018

(54) OPERATION DATA COLLECTION DEVICE FOR WORK MACHINES

(71) Applicant: HITACHI CONSTRUCTION MACHINERY CO., LTD., Tokyo (JP)

(72) Inventors: Jyunsuke Fujiwara, Tokyo (JP); Hideaki Suzuki, Tokyo (JP); Tomoaki Hiruta, Tokyo (JP); Mitsuo Aihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 250 days.

(21) Appl. No.: 15/022,216

(22) PCT Filed: Oct. 17, 2014

(86) PCT No.: PCT/JP2014/077650
§ 371 (c)(1),
(2) Date: Mar. 16, 2016

(87) PCT Pub. No.: WO2015/072280
PCT Pub. Date: May 21, 2015

(65) Prior Publication Data
US 2016/0226977 A1 Aug. 4, 2016

(30) Foreign Application Priority Data

Nov. 12, 2013 (JP) .................................. 2013-233758

(51) Int. Cl.
*G06F 15/16* (2006.01)
*H04L 29/08* (2006.01)
(Continued)

(52) U.S. Cl.
CPC ............ *H04L 67/12* (2013.01); *E02F 9/2054* (2013.01); *E02F 9/267* (2013.01);
(Continued)

(58) Field of Classification Search
CPC ........ H04L 67/06; H04L 67/12; H04W 4/006; E02F 9/2054; E02F 9/267; G05B 23/0264; G05B 23/0235; G06F 19/4184
See application file for complete search history.

(56) References Cited

U.S. PATENT DOCUMENTS 6,499,114 B1* 12/2002 Almstead ........... G05B 19/4184
399/26
2003/0061008 A1* 3/2003 Smith, Jr. .......... G05B 23/0235
702/188
(Continued)

FOREIGN PATENT DOCUMENTS

CA 2 856 218 A1 5/2013
CN 102317881 A 1/2012
(Continued)

OTHER PUBLICATIONS

The Chinese Office Action received in corresponding Chinese Application No. 20148009515.9 dated Apr. 27, 2017.
(Continued)

Primary Examiner — Viet D Vu
(74) Attorney, Agent, or Firm — Mattingly & Malur, PC

(57) ABSTRACT

The operation data collection device for work machines includes a plurality of sensors attached to a work machine to receive measurement data as operation data and record the operation data in an operation data storage section. The operation data collection device further includes: a communication processing section that transmits the operation data stored in the operation data storage section to an external server in response to a download request from the external server; an access history management section that manages a download status of the operation data recorded in the operation data storage section, through the download request from the external server and the transmission of the operation data to the external server; and a recorded data change
(Continued)

processing section that changes a condition for recording the operation data in the operation data storage section in accordance with the download status of the operation data.

3 Claims, 13 Drawing Sheets

(51) Int. Cl.
  *G05B 23/02* (2006.01)
  *E02F 9/26* (2006.01)
  *E02F 9/20* (2006.01)
  *H04W 4/38* (2018.01)
(52) U.S. Cl.
  CPC .......... *G05B 23/0264* (2013.01); *H04L 67/06* (2013.01); *H04W 4/38* (2018.02)

(56) References Cited

U.S. PATENT DOCUMENTS

| | | | |
|---|---|---|---|
| 2005/0085973 A1* | 4/2005 | Furem | E02F 9/2054 701/50 |
| 2006/0267754 A1* | 11/2006 | Takeda | G05B 23/0264 340/506 |
| 2007/0083305 A1* | 4/2007 | Okada | G05B 23/0264 701/31.4 |
| 2008/0222126 A1* | 9/2008 | To | G06F 17/30017 |
| 2009/0006540 A1* | 1/2009 | Liu | G07C 5/008 709/203 |
| 2011/0138031 A1* | 6/2011 | Inami | G06F 17/3002 709/223 |
| 2011/0276842 A1* | 11/2011 | Shibamori | E02F 9/26 714/49 |

FOREIGN PATENT DOCUMENTS

| | | | |
|---|---|---|---|
| EP | 1 777 602 A1 | 4/2007 | |
| EP | 1777602 A1 * | 4/2007 | ......... G05B 23/0264 |
| JP | 2000-089983 A | 3/2000 | |
| JP | 2004-125500 A | 4/2004 | |
| JP | 2012-198606 A | 10/2012 | |
| WO | 2013077309 A1 | 5/2013 | |

OTHER PUBLICATIONS

International Preliminary Report on Patentability received in corresponding International Application No. PCT/JP2014/077650 dated May 26, 2016.
International Search Report of PCT/JP2014/077650 dated Jan. 20, 2015.
Extended European Search Report received in corresponding European Application No. 14861233.6 dated May 24, 2017.

* cited by examiner

| DATE/TIME RECEIVED |
|---|
| PART/SYSTEM ID, SENSOR ID, SENSOR VALUE |
| PART/SYSTEM ID, SENSOR ID, SENSOR VALUE |
| ... |

FIG. 7

| PART/SYSTEM (ID) | SENSOR (ID) | DATA ACQUIRED |
|---|---|---|
| ENGINE AIR INTAKE SYSTEM (m1) | INTERCOOLER INLET TEMPERATURE SENSOR (T1) | INTERCOOLER INLET TEMPERATURE [°C] |
| | INTERCOOLER INLET PRESSURE SENSOR (P1) | INTERCOOLER INLET PRESSURE [kPa] |
| | INTERCOOLER OUTLET TEMPERATURE SENSOR (T2) | INTERCOOLER OUTLET TEMPERATURE [°C] |
| | INTERCOOLER OUTLET PRESSURE SENSOR (P2) | INTERCOOLER OUTLET PRESSURE [kPa] |
| ENGINE AIR EXHAUST SYSTEM (m2) | EXHAUST TEMPERATURE SENSOR (T3(1)~T3(16)) | EXHAUST TEMPERATURE [°C] |
| ENGINE COOLING WATER SYSTEM (m3) | RADIATOR INLET TEMPERATURE SENSOR (T4) | RADIATOR INLET TEMPERATURE [°C] |
| | RADIATOR OUTLET TEMPERATURE SENSOR (T5) | RADIATOR OUTLET TEMPERATURE [°C] |
| | RADIATOR FRONT AIR TEMPERATURE SENSOR (T6) | RADIATOR FRONT AIR TEMPERATURE [°C] |
| | FAN DRIVE MOTOR INLET PRESSURE SENSOR (P6) | FAN DRIVE MOTOR INLET PRESSURE [Mpa] |
| HYDRAULIC FLUID COOLING SYSTEM (m4) | OIL COOLER FAN MOTOR INLET PRESSURE SENSOR (P8) | FAN MOTOR INLET PRESSURE [Mpa] |
| | HYDRAULIC FLUID TEMPERATURE SENSOR (T10) | HYDRAULIC FLUID TEMPERATURE [°C] |
| | OIL COOLER FRONT TEMPERATURE SENSOR (T11) | OIL COOLER FRONT TEMPERATURE [°C] |
| | OIL COOLER OUTLET TEMPERATURE SENSOR (T12) | OIL COOLER OUTLET TEMPERATURE [°C] |
| ... | | |

FIG. 8

| ITEM ID | PART DIAGNOSED | DETAILS | INTERVALS [msec] | INPUT SENSOR ITEM |
|---|---|---|---|---|
| 1 | ENGINE | ABNORMAL COOLING WATER SYSTEM | 1000 | T4,T5,P6,T6 |
| 2 | ENGINE | ABNORMAL AIR INTAKE SYSTEM | 1000 | T1,P1,T2,P2 |
| 3 | ENGINE | ABNORMAL EXHAUST TEMPERATURE | 1000 | T3(1)–T3(16) |
| 4 | HYDRAULIC SYSTEM | ANOMALOUS HYDRAULIC FLUID COOLING | 1000 | P8,T9,T11,T12 |
| ... | ... | ... | ... | ... |

| OPERATION MODE 1 |
| OPERATION MODE 2 |
| ... |
| OPERATION MODE m |
| ... |
| OPERATION MODE M |

| T1: NORMAL MEAN $\mu_{1T1}$ |
| T1: NORMAL VARIANCE $\sigma_{1T1}$ |
| P1: NORMAL MEAN $\mu_{1P1}$ |
| P1: NORMAL VARIANCE $\sigma_{1P1}$ |
| T2: NORMAL MEAN $\mu_{1T2}$ |
| T2: NORMAL VARIANCE $\sigma_{1T2}$ |
| P2: NORMAL MEAN $\mu_{1P2}$ |
| P2: NORMAL VARIANCE $\sigma_{1P2}$ |

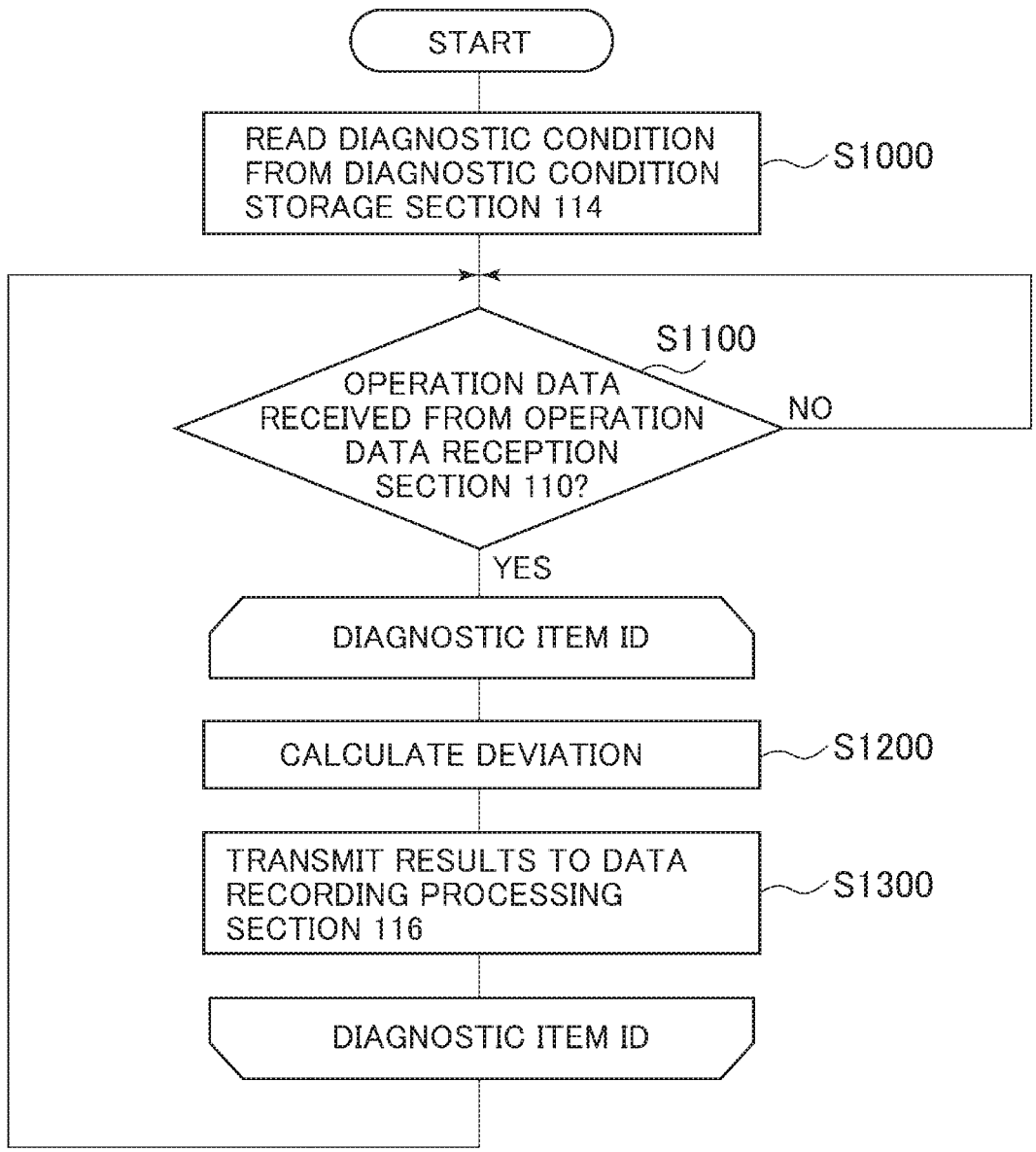

FIG. 10

| DIAGNOSTIC ITEM ID | RECORDING LEVEL | | | |
|---|---|---|---|---|
| | LEVEL 3 | LEVEL 2 | LEVEL 1 | LEVEL 0 |
| 1 | RECORDING WINDOW WIDTH=120 [min] SENSORS=T1,T2, T3(1)-3(16),T4,T5,T6, P1,P2,P5,P6 | RECORDING WINDOW WIDTH=60 [min] SENSORS=T1,T2,T4, T5,T6,P1,P2,P5,P6 | RECORDING WINDOW WIDTH=20 [min] SENSORS=T4,T5, P6,T6 | RECORDING WINDOW WIDTH=0 [min] SENSORS=NONE |
| 2 | RECORDING WINDOW WIDTH=120 [min] SENSORS=T1,T2, T3(1)-3(16),T4,T5,T6, P1,P2,P5,P6 | RECORDING WINDOW WIDTH=60 [min] SENSSORS=T1,T2,T4, T5,T6,P1,P2,P5,P6 | RECORDING WINDOW WIDTH=20 [min] SENSORS=T1,P1,T2,P2 | RECORDING WINDOW WIDTH=0 [min] SENSORS=NONE |
| 3 | RECORDING WINDOW WIDTH=120 [min] SENSORS=T1,T2, T3(1)-3(16),T4,T5,T6, P1,P2,P5,P6 | RECORDING WINDOW WIDTH=60 [min] SENSORS=T3(1)-T3(16) | RECORDING WINDOW WIDTH=20 [min] SENSORS=T3(1)-T3(16) | RECORDING WINDOW WIDTH=0 [min] SENSORS=NONE |
| 4 | RECORDING WINDOW WIDTH=120 [min] SENSORS=P8, T10,T11,T12 | RECORDING WINDOW WIDTH=120 [min] SENSORS=P8, T10,T11,T12 | RECORDING WINDOW WIDTH=120 [min] SENSORS=P8, T10,T11,T12 | RECORDING WINDOW WIDTH=0 [min] SENSORS=NONE |

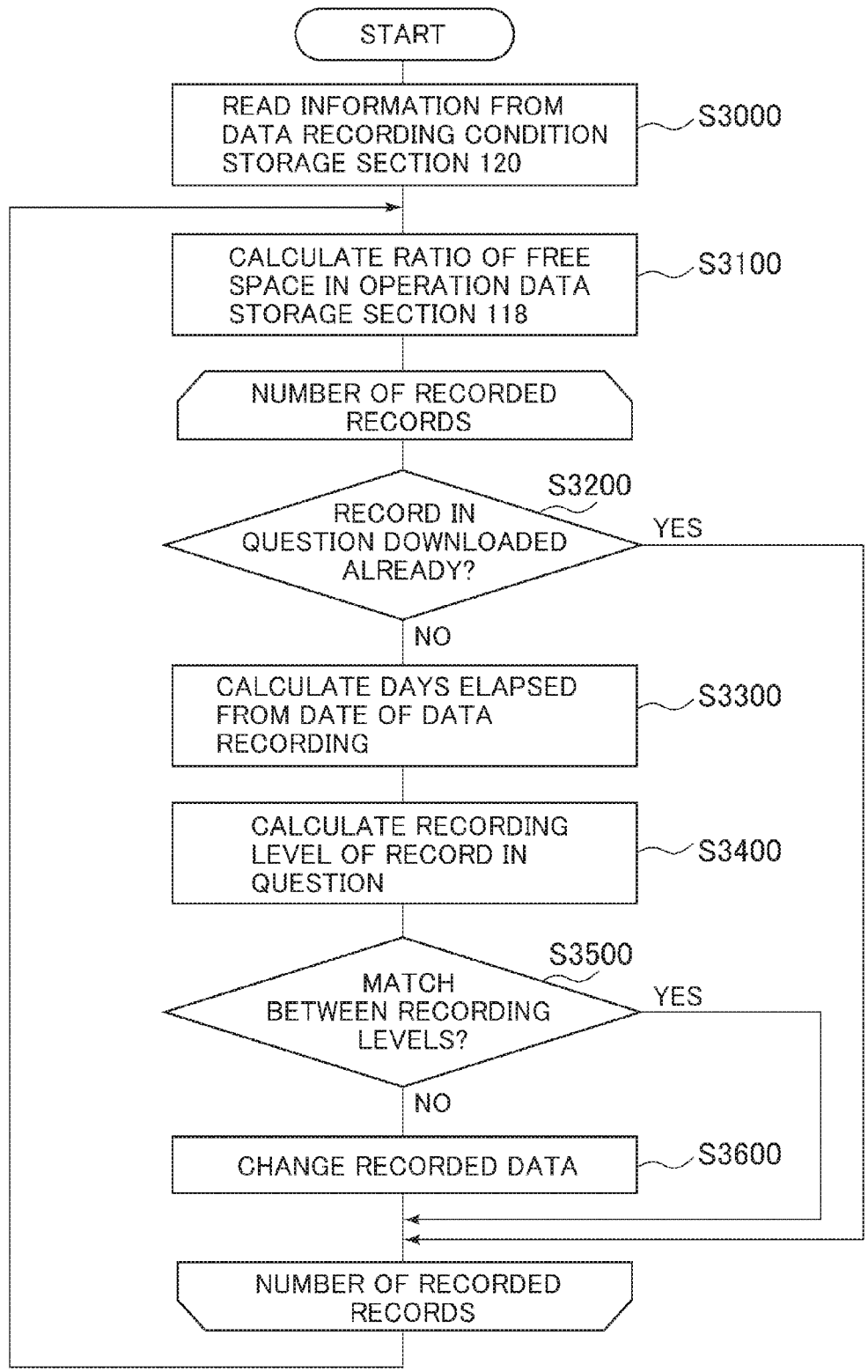

OPERATION DATA COLLECTION DEVICE FOR WORK MACHINES

TECHNICAL FIELD

The present invention relates to an operation data collection device for work machines, and more specifically, to an operation data collection device for work machines that is mounted to work machines to ensure savings in storage space.

BACKGROUND ART

Large-size excavators and dump trucks (self-propelled machines) used, for example, in mines are operating throughout the world for excavation and transport of debris or other work, and it is often required for these machines to operate continuously for improved productivity. To proactively avoid failures that could disturb such continuous operation, a status monitoring system is known that collects and accumulates sensor data (hereinafter referred to as operation data) showing the operation status of a work machine using an operation data collection device mounted to the work machine in such a manner that a faulty condition is detected promptly through diagnosis of signs based on operation data.

One among operation data collection devices making up such an operation status monitoring system is an operation data collection device for construction machines (work machines) that can efficiently collect operation data showing indications of failures of construction machines (work machines) by reducing the amount of recorded information collected and accumulated without causing any deterioration in information quality useful for maintenance (refer, for example, to Patent Document 1).

PRIOR ART DOCUMENTS

Patent Documents

Patent document 1: International Publication No. WO2013/077309

SUMMARY OF THE INVENTION

Problems to be Solved by the Invention

With the above mentioned status monitoring system, two options are available to acquire operation data: one by remote monitoring, that is, acquiring data from an operation data collection device mounted to the work machine via a wireless communication line using a server; and another by having a maintenance staff member visit the work machine on site, directly download operation data from the operation data collection device, and verify the data.

The former is desirable in terms of constantly monitoring the work machine. However, communication infrastructure is not available in many of mines where work machines operate. As a result, the latter option is often adopted. In the case of the latter option, the operation data collection frequency is determined by how often a maintenance staff member accesses the work machine. If, for some reason, a maintenance staff member no longer visits the work machine as often, there is a likelihood that the amount of collected operation data may reach the storage capacity of the operation data collection device, thus resulting in important operation data, necessary for detecting causes of failures, being overwritten and deleted before downloaded to an external.

Further, even when the former option is adopted, if the work machine moves out of the communication range, the communication link between the server and the operation data collection device is lost, making it impossible to collect operation data. If the server and the operation data collection device remain unconnected for a long time, a similar problem as for the latter option occurs, making loss of important data likely.

A possible solution to these problems would be to enhance the storage capacity of the operation data collection device. However, there are demands for more compact parts mounted to work machines and cost saving, thus making this solution unrealistic. Further, loss of operation data makes it impossible to detect signs of failures of the work machine, thus making it difficult to avoid failures accurately and proactively.

The present invention has been devised in light of the foregoing, and it is an object of the present invention to provide an operation data collection device for work machines that ensures savings in storage capacity while at the same time preserving important operation data recorded at the time of a faulty condition even when the frequency of access diminishes.

Means for Solving the Problems

To solve the above problems, the present application includes a plurality of means, one of which is an operation data collection device for work machines that has a plurality of sensors attached to a work machine. The operation data collection device receives measurement data of the sensors as operation data and records it in an operation data storage section. The operation data collection device includes a communication processing section, an access history management section, and a recorded data change processing section. The communication processing section transmits the operation data from the operation data storage section to an external server in response to a download request from the external server. The access history management section manages a download status of the operation data recorded in the operation data storage section, through the download request from the external server and the transmission of the operation data to the external server. The recorded data change processing section changes a condition for recording the operation data in the operation data storage section in accordance with the download status of the operation data acquired by the access history management section.

Effect of the Invention

The present invention adjusts the extent and intervals for recording collected operation data in accordance with the download status and the free space of the operation data storage section. Therefore, even if the frequency of access diminishes, it is possible to ensure savings in storage capacity while at the same time preserving important operation data. This makes it possible' to detect potential failures promptly through diagnosis of signs, accurately and proactively avoiding failures that could disturb continuous operation for enhanced productivity in work machines.

BRIEF DESCRIPTION OF THE DRAWINGS

FIG. 7 is a table illustrating an example of systems making up a work machine and organization of sensor information in the work machine to which the embodiment of the operation data collection device for work machines of the present invention is applied;

FIG. 8 is a table illustrating an example of information stored in a diagnostic condition storage section in the embodiment of the operation data collection device for work machines of the present invention;

FIG. 9 is a flowchart illustrating details of steps handled by a diagnostic processing section in the embodiment of the operation data collection device for work machines of the present invention;

FIG. 10 is a table illustrating an example of a recording condition table that includes a recording condition for each recording level stored in a data recording condition storage section in the embodiment of the operation data collection device for work machines of the present invention;

FIG. 14 is a flowchart illustrating details of steps handled by a recorded data change processing section in the embodiment of the operation data collection device for work machines of the present invention.

MODES FOR CARRYING OUT THE INVENTION

Figure 1:
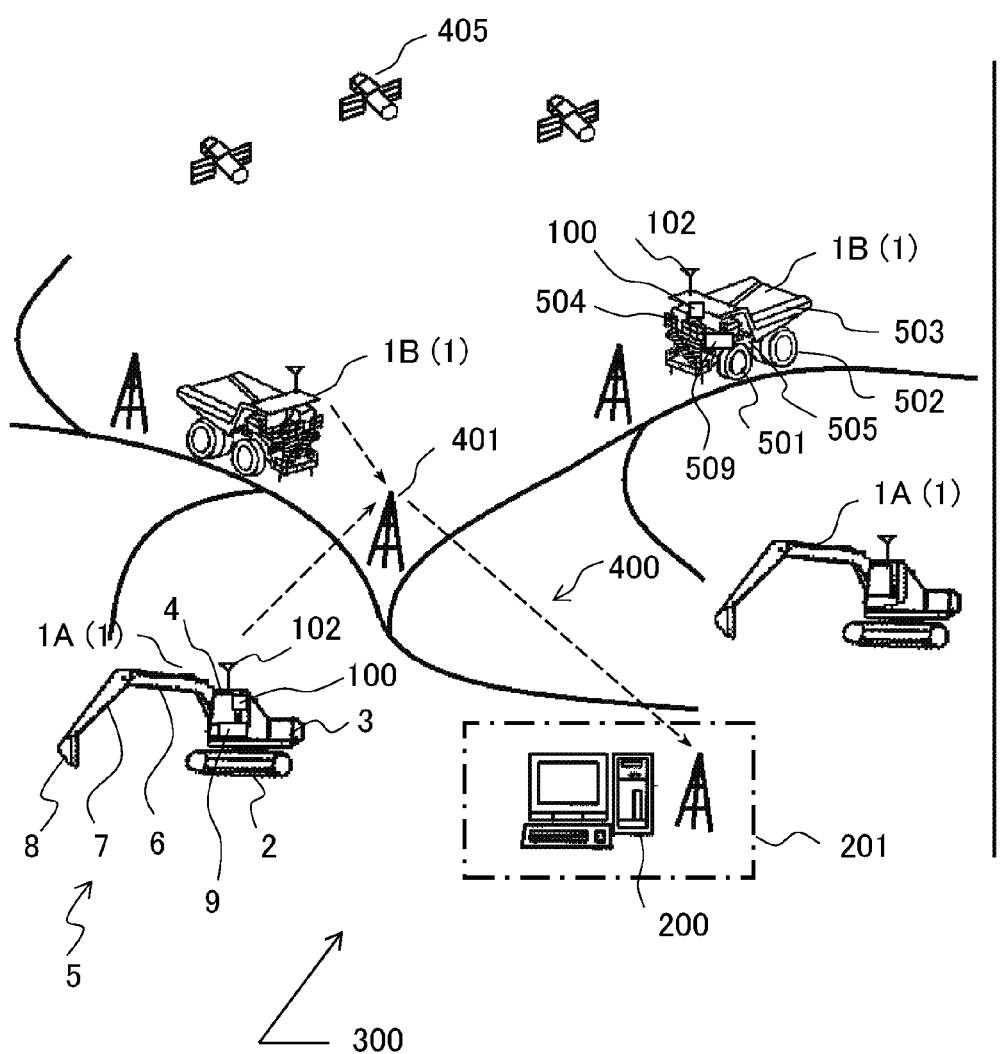
FIG. 1 is a conceptual diagram illustrating a configuration of an operation data collection system that includes an embodiment of an operation data collection device for work machines of the present invention.
Figure 2:
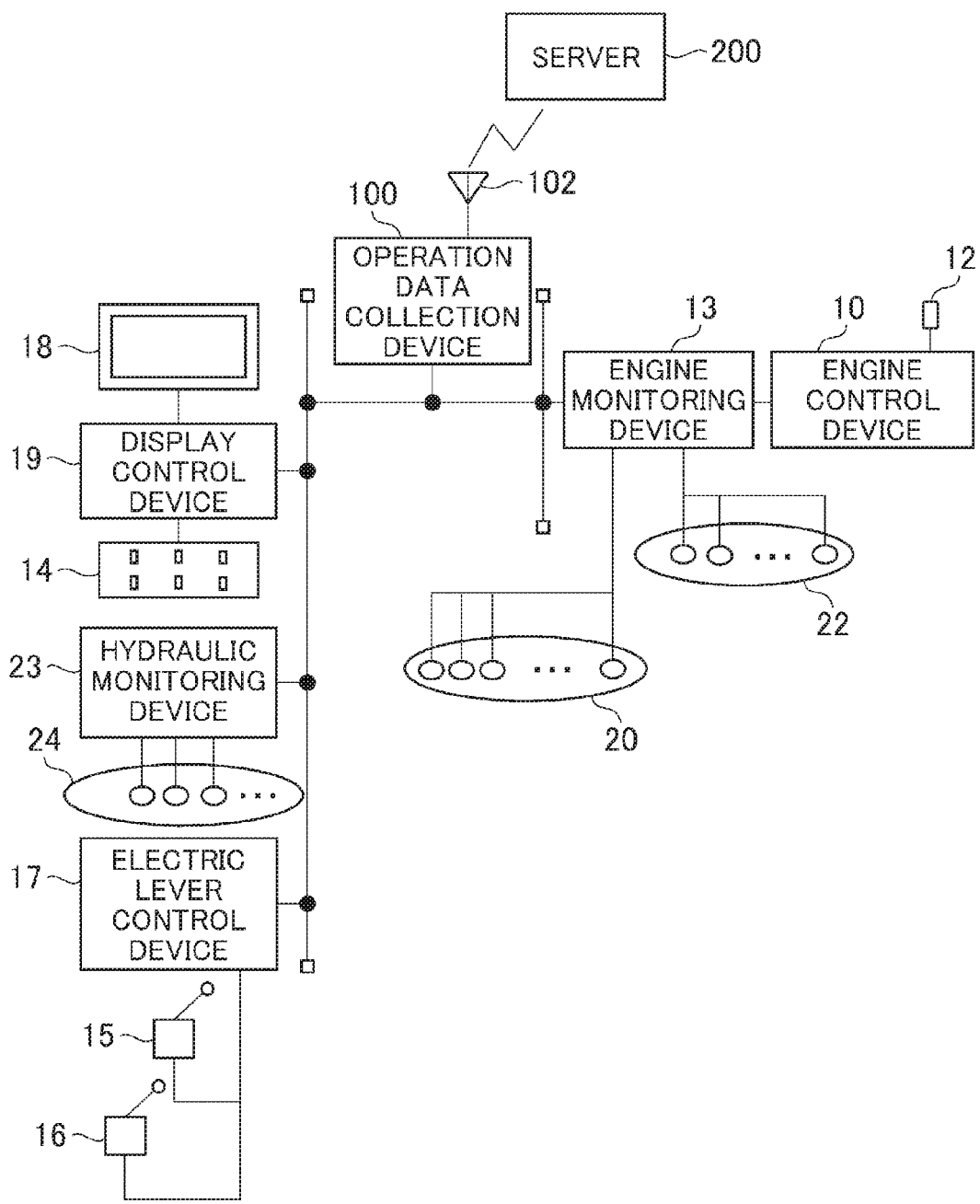
FIG. 2 is a schematic configuration diagram illustrating a configuration of a controller network in the embodiment of the operation data collection device for work machines of the present invention.
Figure 3:
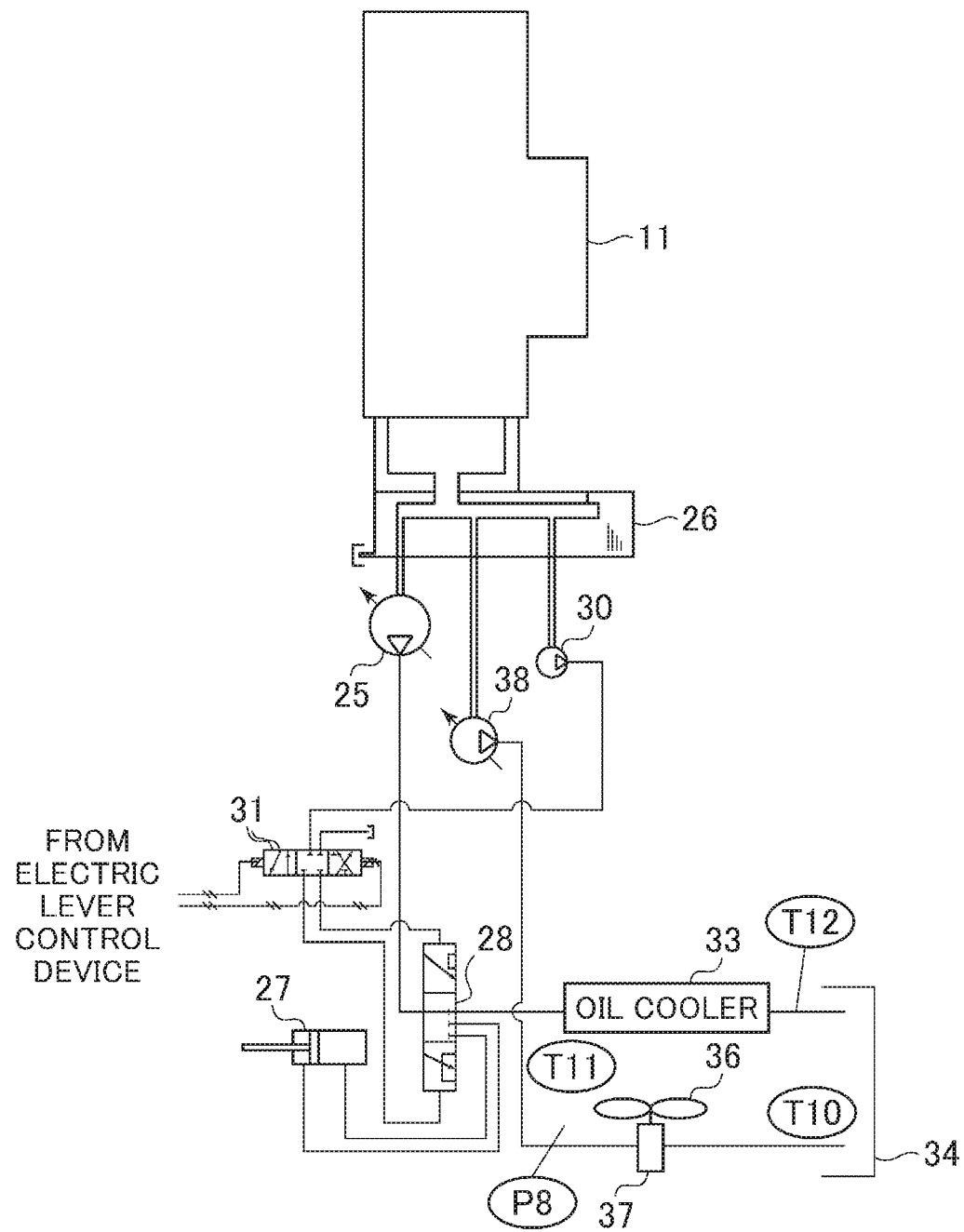
FIG. 3 is a schematic configuration diagram illustrating an overall schematic configuration of a hydraulic fluid cooling system of a hydraulic excavator that includes the embodiment of the operation data collection device for work machines of the present invention.
Figure 4:
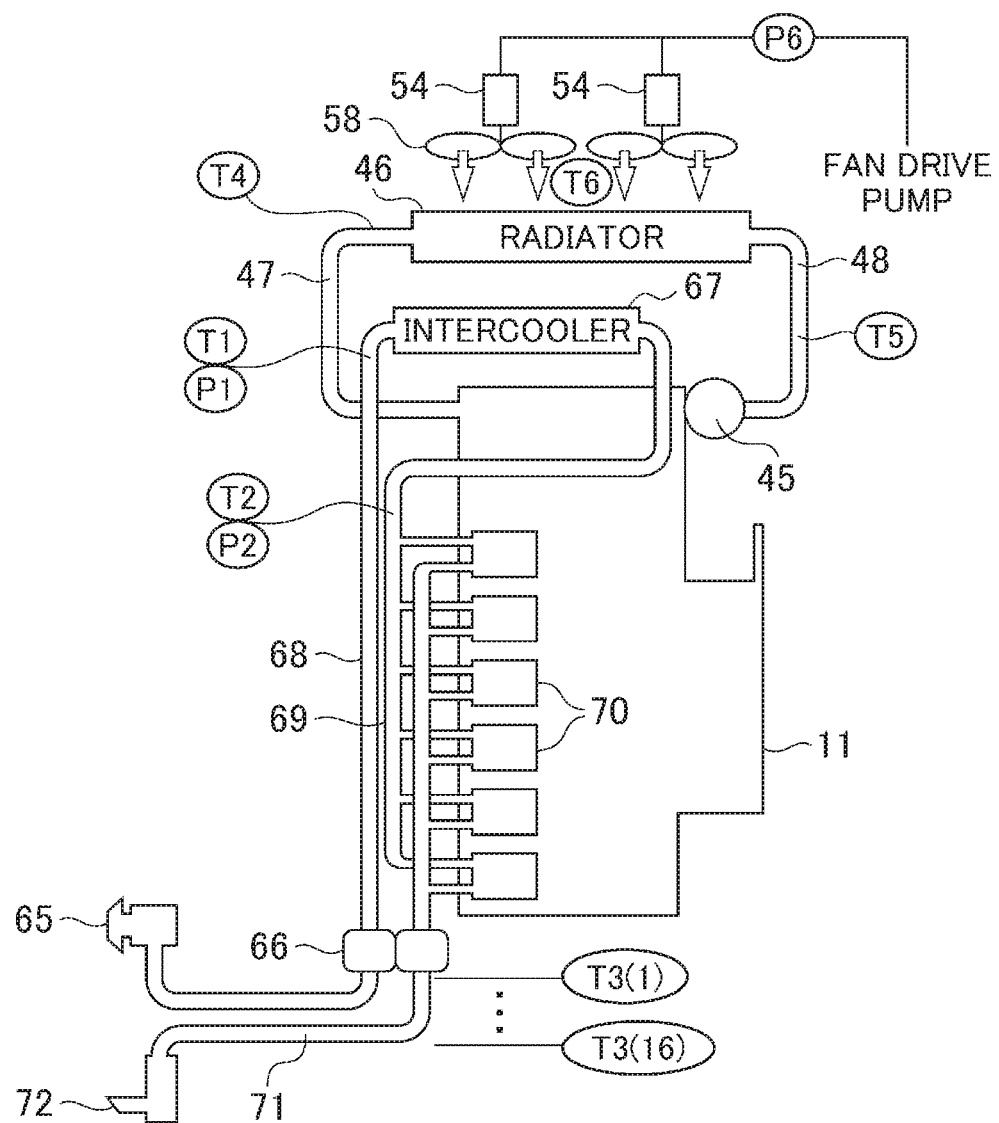
FIG. 4 is a schematic configuration diagram illustrating an overall schematic configuration of an engine cooling water system and an intake system of a hydraulic excavator that includes the embodiment of the operation data collection device for work machines of the present invention.

A description will be given below of an embodiment of an operation data collection device for work machines of the present invention with reference to the accompanied drawings by taking, as an example, a hydraulic excavator (hereinafter abbreviated as an "excavator") and a dump truck (hereinafter abbreviated as a "dumper") used in mines or elsewhere as a work machine. FIG. 1 is a conceptual diagram illustrating a configuration of an operation data collection system that includes an embodiment of an operation data collection device for work machines of the present invention. FIG. 2 is a schematic configuration diagram illustrating a controller network in the embodiment of the operation data collection device for work machines of the present invention. FIG. 3 is a schematic configuration diagram illustrating an overall schematic configuration of a hydraulic fluid cooling system of a hydraulic excavator that includes the embodiment of the operation data collection device for work machines of the present invention. FIG. 4 is a schematic configuration diagram illustrating an overall schematic configuration of an engine cooling water system and an intake system of a hydraulic excavator that includes the embodiment of the operation data collection device for work machines of the present invention.

As illustrated in FIG. 1, work machines 1 (self-propelled machines) such as excavators 1A and dumpers 1B are used in a mine quarry, with an operation data collection system 300 employed to collect operation data of these work machines 1. With the operation data collection system 300, a server 200 is provided near the quarry or at a remote management center 201. Further, each of the work machines has a position acquisition device (not shown) and various sensors (not shown). The position acquisition device acquires its own position using a GPS satellite 405. Then, an operation data collection device 100 mounted to each of the work machines 1 transmits a variety of data, diagnostic results, and other information to the server 200 via a wireless communication line 400. It should be noted that reference numeral 401 represents a fixed station.

The excavator 1A is an extra-large size hydraulic excavator and includes a travel structure 2, a swing structure 3, a cab 4, and a front work device 5. The swing structure 3 is swingably provided on the travel structure 2. The front work device 5 is provided at a front center of the swing structure 3. The front work device 5 includes a boom 6, an arm 7, and a bucket 8. The boom 6 is rotatably provided on the swing structure 3. The arm 7 is rotatably provided at the tip of the boom 6. The bucket 8 is provided at the tip of the arm 7. An operation data collection device 100A is installed inside the cab 4, with an antenna 102 installed, for example, on top of the cab 4 where good visibility is available. Further, the excavator 1A has a controller network 9 to collect state quantities relating to the operating state of each of the parts of the excavator 1A.

Still further, the dumper 1B includes a frame 505, a cab 504, front and rear wheels 501 and 502, a bed 503, and a pair of left and right hoist cylinders (not shown). The frame 505 forms the main frame. The bed 503 can rotate vertically about a hinge pin (not shown) provided on the rear area of the frame 505. The hoist cylinders vertically rotate the bed 503. Still further, a controller network 509 is provided inside the cab 504 to collect state quantities relating to the operating state of each of the parts of the dumper 1B. It should be noted that an operation data collection device 100B is installed inside the cab 504, with the antenna 102 installed, for example, on top of the cab 504 where good visibility is available.

A description will be given next of a configuration example of the controller network 9 of the excavator 1A with reference to FIG. 2. As illustrated in FIG. 2, the controller network 9 includes an engine control device 10, an injection amount control device 12, an engine monitoring device 13, electric levers 15 and 16, an electric lever control device 17, a display 18, a display control device 19, a keypad 14, a hydraulic monitoring device 23, and an operation data collection device 100. The electric levers 15 and 16 are used to operate the travel structure 2 and the front work device 5, respectively. The electric lever control device 17 controls the hydraulic pressure in accordance with how much the electric levers 15 and 16 are operated.

The engine control device 10 regulates the amount of fuel injected to an engine 11 (refer to FIGS. 3 and 4) by controlling the injection amount control device 12. On the other hand, the engine monitoring device 13 acquires state quantities relating to the operating state of the engine 11 from a variety of sensors for monitoring. Among sensors used to detect the operating state of the engine 11 are sensor groups 20 and 22. The sensor group 20 is used to sense the operating states of the intake and exhaust systems of the engine. The sensor group 22 is used to sense the operating state of the cooling water system of the engine. These sensor groups are connected to the engine monitoring device 13.

Although described in detail later, the sensor group 20 relating to the intake and exhaust systems of the engine 11 includes not only an intercooler inlet temperature sensor T1 (refer to FIG. 4), an intercooler inlet pressure sensor P1 (refer to FIG. 4), an intercooler outlet temperature sensor T2 (refer to FIG. 4), an intercooler outlet pressure sensor P2 (refer to FIG. 4) but also exhaust temperature sensors T3(1) to T3(16) and other sensors. The sensors T1, P1, T2, and P2 are provided at the inlet and outlet of the intercooler that cools air taken into the engine 11. Each of the sensors T3(1) to T3(16) detects the exhaust temperature of one of the cylinders (assuming 16 cylinders). Although described in detail later again, the sensor group 22 relating to the cooling air system includes radiator inlet and outlet temperature sensors T4 and T5 and other sensors. The sensors T4 and T5 are provided respectively before and after the radiator used to cool cooling water that circulates inside the engine 11.

The engine control device 10 and the engine monitoring device 13 are connected by a communication line. On the other hand, the engine monitoring device 13 and the operation data collection device 100 are connected by a network line. Such a configuration allows for transmission of state quantities relating to the operating states of the intake and exhaust systems and the cooling water system of the engine 11 detected by a variety of sensors to the operation data collection device 100.

The display 18 is provided in the cab 4 to show a variety of operation information of the hydraulic excavator 1A. The display control device 19 is connected to the display 18 to control what shows on the display 18. On the other hand, the keypad 14 is connected to the display control device 19 to accept, for example, various data settings and switching between screens of the display 18 through control input from the operator.

The hydraulic monitoring device 23 monitors state quantities relating to the operating state of the hydraulic system of the hydraulic excavator 1A. A variety of sensors are connected to the hydraulic monitoring device 23 to detect the operating state of the hydraulic system. For example, a sensor group 24 is connected to sense the operating state of the hydraulic fluid cooling system. Although described in detail later, the sensor group 24 used to sense the operating state of the hydraulic fluid cooling system includes an oil cooler outlet temperature sensor T12, a hydraulic fluid temperature sensor T10, and other sensors. The sensor T12 is provided at the outlet of an oil cooler that cools hydraulic fluid. The sensor T10 detects the temperature of hydraulic fluid.

The hydraulic monitoring device 23 and the operation data collection device 100 are connected by a network line, thus allowing state quantities relating to the operating state of the hydraulic fluid cooling system detected by the hydraulic monitoring device 23 to be transmitted to the operation data collection device 100, as well.

The operation data collection device 100 is connected to the hydraulic monitoring device 23 and the engine monitoring device 13 via the network line. The operation data collection device 100 thereby receives from the hydraulic monitoring device 23 sensor data of the hydraulic system such as sensor data relating to the operating state of the hydraulic fluid cooling system and sensor data of the engine 11 such as sensor data relating to the operating states of the intake and exhaust systems and the cooling water system as operation data of the hydraulic excavator 1A.

Further, the operation data collection device 100 is connected to the server 200 via the antenna 102, thus allowing for download of operation data acquired by the operation data collection device 100 from the server 200 via a wireless network.

A description will be given next of an overall schematic configuration of a hydraulic fluid cooling system of the hydraulic excavator 1A with reference to FIG. 3.

In FIG. 3, reference numeral 11 represents an engine, reference numeral 25 a main pump, and reference numeral 27 an actuator (e.g., boom cylinder or arm cylinder). The engine 11 is mounted to the swing structure 3 of the hydraulic excavator 1A. The main pump 25 is driven by rotational driving force of a crankshaft (not shown) of the engine 11 via a pump transmission 26. The actuator 27 is driven by hydraulic fluid delivered from the main pump 25.

Further, reference numeral 28 represents a control valve, reference numeral 30 a pilot pump, and reference numeral 31 a pilot reducing valve. The control valve 28 is connected to a delivery pipe of the main pump 25 to regulate the flow rate and direction of hydraulic fluid to the actuator 27. The pilot pump 30 is driven by rotational driving force of the crankshaft of the engine 11 via the pump transmission 26, as is the main pump 25. The pilot pump 30 produces a pilot source pressure used to switch and drive the control valve 28. The pilot reducing valve 31 is connected to the delivery pipe of the pilot pump 30 to reduce the pilot source pressure generated by the pilot pump 30 in response to a control signal supplied from the electric lever control device 17 and produce a pilot pressure.

Still further, reference numeral 33 represents an oil cooler, reference numeral 36 an oil cooler cooling fan, reference numeral 37 an oil cooler fan drive motor, and reference numeral 38 an oil cooler fan drive pump. The oil cooler 33 is provided between the control valve 28 and a hydraulic fluid tank 34 to cool hydraulic fluid. The oil cooler cooling fan 36 produces cooling airflow to cool the oil cooler 33. The oil cooler fan drive motor 37 drives the oil cooler cooling fan. The oil cooler fan drive pump 38 is driven by rotational driving force of the crankshaft (not shown) of the engine 11 via the pump transmission 26 to supply, via the delivery pipe, hydraulic fluid used to drive the oil cooler fan drive motor 37.

It should be noted that although only one actuator, and one control valve and one pilot reducing valve for the actuator, are shown in FIG. 3 for reasons of convenience, many actuators are actually mounted to the hydraulic excavator 1A, and that a plurality of control valves, a plurality of pilot reducing valves, and other hydraulic equipment are provided for these actuators.

A description will be given next of a variety of sensors in the hydraulic fluid cooling system of the hydraulic system illustrated in FIG. 3. In FIG. 3, reference numeral T10 represents the hydraulic fluid temperature sensor, and reference numeral T11 an oil cooler front temperature sensor. The hydraulic fluid temperature sensor T10 detects the hydraulic fluid temperature in the hydraulic fluid tank 34. The oil cooler front temperature sensor T11 detects the air temperature in front of the oil cooler cooling fan 36 of the oil cooler 33. Reference numeral T12 represents an oil cooler outlet temperature sensor provided on a downstream pipe of the oil cooler 33 to detect the temperature of hydraulic fluid flowing out of the oil cooler 33.

Further, reference numeral P8 represents a fan motor inlet pressure sensor that detects the pressure of hydraulic fluid flowing into the oil cooler fan drive motor 37.

Referring back to FIG. 2, fed to the hydraulic monitoring device 23 are state quantities acquired by the sensors included in the sensor group 24 that detects the operating state of the hydraulic fluid cooling system, i.e., sensor data, namely, the hydraulic fluid temperature detected by the hydraulic fluid temperature sensor T10, the oil cooler front temperature detected by the oil cooler front temperature sensor T11, the oil cooler outlet temperature detected by the oil cooler outlet temperature sensor T12, and the fan drive motor inlet pressure detected by the fan motor inlet pressure sensor P8. Then, the hydraulic monitoring device 23 transmits to the operation data collection device 100 via the network line the fed sensor data described above as sensing data relating to the hydraulic fluid cooling system of the hydraulic system.

A description will be given next of an overall schematic configuration of the cooling water system and the intake and exhaust systems of the engine 11 of the hydraulic excavator 1A with reference to FIG. 4.

The cooling water system of the engine 11 will be described first. In FIG. 4, reference numeral 45 represents a cooling water pump driven by rotational driving force of the crankshaft (not shown) of the engine 11 via the pump transmission 26. Reference numeral 46 represents a radiator that cools cooling water, delivered from the cooling water pump 45, whose temperature has increased after having cooled the engine 11. Further, reference numeral 47 represents a radiator inlet pipe, and reference numeral 48 a radiator outlet pipe. The radiator inlet pipe 47 is connected to the inlet of the radiator 46. The radiator outlet pipe 48 is connected to the outlet of the radiator 46. Reference numeral 54 represents a radiator cooling fan drive motor driven by hydraulic fluid from an unshown fan drive pump. Reference numeral 58 represents a radiator cooling fan driven by the radiator cooling fan drive motor 54 to produce airflow for cooling the radiator 46.

A description will be given next of a variety of sensors in the engine cooling water system in FIG. 4. In FIG. 4, reference numeral T6 represents a radiator front air temperature sensor that detects the air temperature nearest the radiator 46 on the side of the radiator cooling fan drive motor 54. Reference numeral T4 represents the radiator inlet temperature sensor provided on the radiator inlet pipe 47 to detect the temperature of cooling water flowing into the radiator 46. Reference numeral T5 represents the radiator outlet temperature sensor provided on the radiator outlet pipe 48 to detect the temperature of cooling water flowing out of the radiator 46. Reference numeral P6 represents a fan drive motor inlet pressure sensor provided on an inlet pipe to the radiator cooling fan drive motor 54 to detect the pressure of hydraulic fluid flowing into the radiator cooling fan drive motor 54.

Referring back to FIG. 2, fed to the engine monitoring device 13 are state quantities acquired by the sensors included in the sensor group 20 that detects the operating state of the cooling water system of the engine 11, i.e., sensor data, namely, the radiator front air temperature detected by the radiator front air temperature sensor T6, the radiator inlet temperature detected by the radiator inlet temperature sensor T4, the radiator outlet temperature detected by the radiator outlet temperature sensor T5, and the fan drive motor inlet pressure detected by the fan drive motor inlet pressure sensor P6. Then, the engine monitoring device 13 transmits to the operation data collection device 100 via the network line the fed sensor data described above as sensing data relating to the cooling water system of the engine 11.

A description will be given next of the intake and exhaust systems of the engine 11 with reference to FIG. 4. In FIG. 4, reference numerals 65 and 66 represent an air cleaner and a turbo, respectively. The turbo 66 pressurizes air taken in from the air cleaner 65. Reference numeral 67 represents an intercooler that cools air pressurized by the turbo 66 and taken into the engine 11. Reference numeral 68 represents an intercooler inlet pipe connected to the inlet of the intercooler 67. Reference numeral 69 represents an intercooler outlet pipe connected to the outlet of the intercooler 67. Reference numeral 70 represents a plurality of cylinders that are provided in the engine 11 to take in air cooled by the intercooler 67 and mix it with fuel for combustion. Reference numeral 71 represents an exhaust pipe, and reference numeral 72 a muffler. The exhaust pipe 71 discharges combustion gas exhaust produced by the plurality of cylinders 70.

A description will be given next of a variety of sensors in the intake and exhaust systems of the engine shown in FIG. 4. In FIG. 4, reference numeral P1 represents an intercooler inlet pressure sensor provided on the intercooler inlet pipe 68 to detect the pressure of air flowing into the intercooler 67. Reference numeral T1 represents an intercooler inlet temperature sensor provided on the intercooler inlet pipe 68 to detect the temperature of air flowing into the intercooler 67. Reference numeral P2 represents an intercooler outlet pressure sensor provided on the intercooler outlet pipe 69 to detect the pressure of air discharged from the intercooler 67. Reference numeral T2 represents an intercooler outlet temperature sensor provided on the intercooler inlet pipe 69 to detect the temperature of air discharged from the intercooler 67. Further, reference numeral T3 represents an exhaust temperature sensor provided on the exhaust pipe 71 to detect the engine exhaust temperature. In the case of a 16-cylinder engine, 16 exhaust temperature sensors T3(1) to T3(16) are provided, one for each cylinder.

Referring back to FIG. 2, fed to the engine monitoring device 13 are state quantities acquired by the sensors included in the sensor group 22 that detects the operating state of the intake and exhaust systems of the engine 11, i.e., Sensor data, namely, the intercooler inlet temperature detected by the intercooler inlet temperature sensor T1, the intercooler inlet pressure detected by the intercooler inlet pressure sensor P1, the intercooler outlet temperature detected by the intercooler outlet temperature sensor T2, the intercooler outlet pressure detected by the intercooler outlet pressure sensor P2, and the exhaust temperatures detected by the exhaust temperature sensors T3(1) to T3(16). Then, the engine monitoring device 13 transmits to the operation data collection device 100 via the network line the fed sensor data described above as sensing data relating to the intake and exhaust systems of the engine 11.

Figures 5, 6:
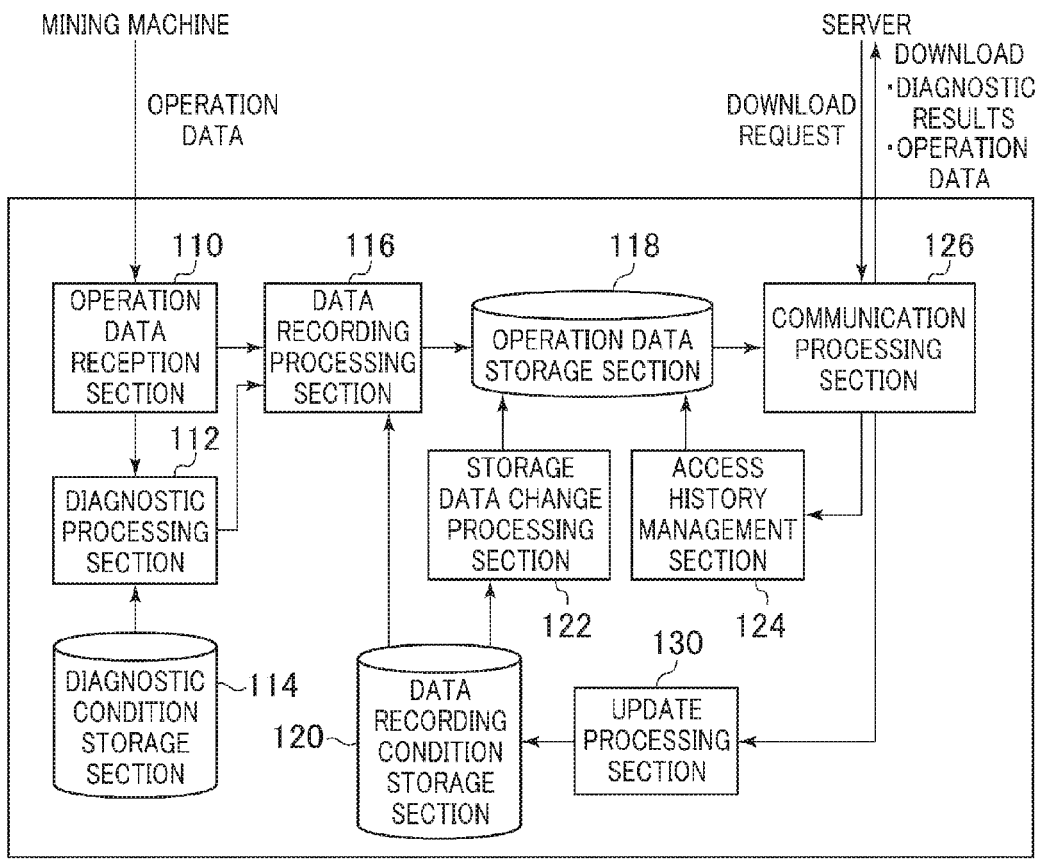
FIG. 5 is a schematic configuration diagram illustrating a configuration of the embodiment of the operation data collection device for work machines of the present invention.
FIG. 6 is a table illustrating an example of organization of operation data in the embodiment of the operation data collection device for work machines of the present invention.

A description will be given next of a configuration of the operation data collection device 100 with reference to FIG. 5. FIG. 5 is a schematic configuration diagram illustrating a configuration of the embodiment of the operation data collection device for work machines of the present invention.

In the present invention, the operation data collection device 100 for work machines includes an operation data reception section 110, a diagnostic processing section 112, a diagnostic condition storage section 114, a data recording processing section 116, an operation data storage section 118, a data recording condition storage section 120, a data change processing section 122, an access history management section 124, a communication processing section 126, and an update processing section 130.

The operation data reception section 110 is connected to the engine monitoring device 13 and the hydraulic monitoring device 23 via a communication line as illustrated in FIG. 2 to receive measurement data of a variety of sensors as state quantities for each part/system and as operation data.

The diagnostic processing section 112 accepts entry of operation data received by the operation data reception section 110 and diagnostic item information from the diagnostic condition storage section 114 to proceed with diagnostic processing designed to diagnose the operating state of each part/system of the work machine such as the engine or hydraulic system.

The diagnostic condition storage section 114 stores diagnostic item information used by the diagnostic processing section 112 for diagnostic processing.

The data recording processing section 116 receives results of diagnosis made by the diagnostic processing section 112 to record the results in the operation data storage section 118. Further, if operation data received by the operation data reception section 110 and a recording condition stored in the data recording condition storage section 120 have already been entered, and if the data recording processing section 116 identifies the occurrence of a faulty condition based on diagnostic results received from the diagnostic processing section 112, the data recording processing section 116 operates in such a manner as to record operation data on given sensor items for a given time width relative to the time of occurrence of a faulty condition. Time widths and sensor items relating to the recording conditions are stored in the data recording condition storage section 120.

The operation data storage section 118 stores operation data and diagnostic results recorded by the data recording processing section 116.

The communication processing section 126 transmits, in response to a download request from the external server 200, operation data and diagnostic results to the external server 200 stored in the operation data storage section 118. The communication processing section 126 also transmits the update information file of the data recording condition storage section 120, received from the external server 200, to the update processing section 130.

The update processing section 130 accepts the update information file from the external server 200 received by the communication processing section 126 to rewrite the content of the data recording condition storage section 120 based on the update information file.

The access history management section 124 manages a history of operation data and diagnostic results transmitted from the communication processing section 126 to the external server 200. More specifically, after the communication processing section 126 transmits, to the external server 200, operation data and diagnostic results extracted from the operation data storage section 118, the access history management section 124 records management information about the download status of the operation data and the diagnostic results recorded in the operation data storage section 118 (download yes/no flag and date and time of download).

The data change processing section 122 changes information about operation data and diagnostic results recorded in the operation data storage section 118 based on the download status of the operation data and the diagnostic results recorded in the operation data storage section 118, number of days elapsed from the date and time of data recording, a remaining recordable free space of the operation data storage section 118, and information about recording level corresponding to a recording condition stored in the data recording condition storage section 120.

The data recording condition storage section 120 stores information about a relationship between a recordable remaining space of the operation data storage section 118 and a recording level and information about a relationship between number of days elapsed from the date of data recording stored in the operation data storage section 118 and a recording level. Here, the term "recording level", refers to a recording condition. The higher the value, the larger the amount of information. A sensor item and a recording time window width are available as parameters. The data recording condition storage section 120 also stores settings for these parameters.

Figure 11A:
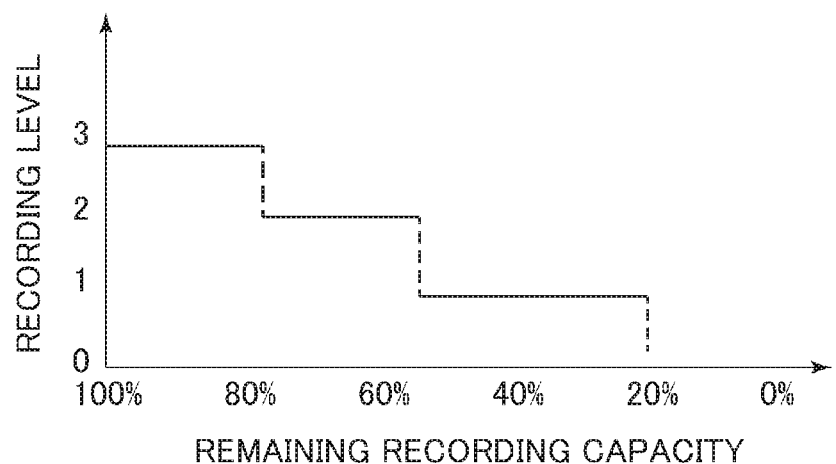
FIG. 11A is a characteristic chart illustrating a relationship between a recording level and a recordable remaining space of the data recording condition storage section in the embodiment of the operation data collection device for work machines of the present invention.
Figure 11B:
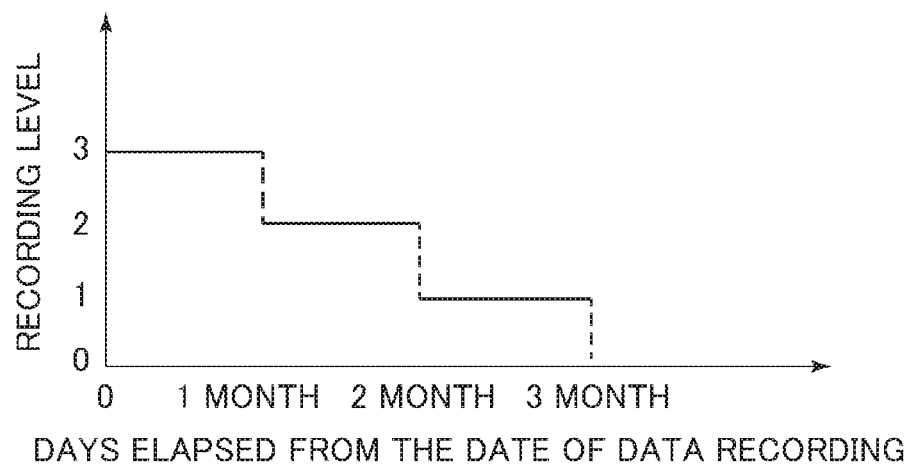
FIG. 11B is a characteristic chart illustrating a relationship between the recording level of the data recording condition storage section and the number of days elapsed from the date of data recording in the embodiment of the operation data collection device for work machines of the present invention.
Figure 12:
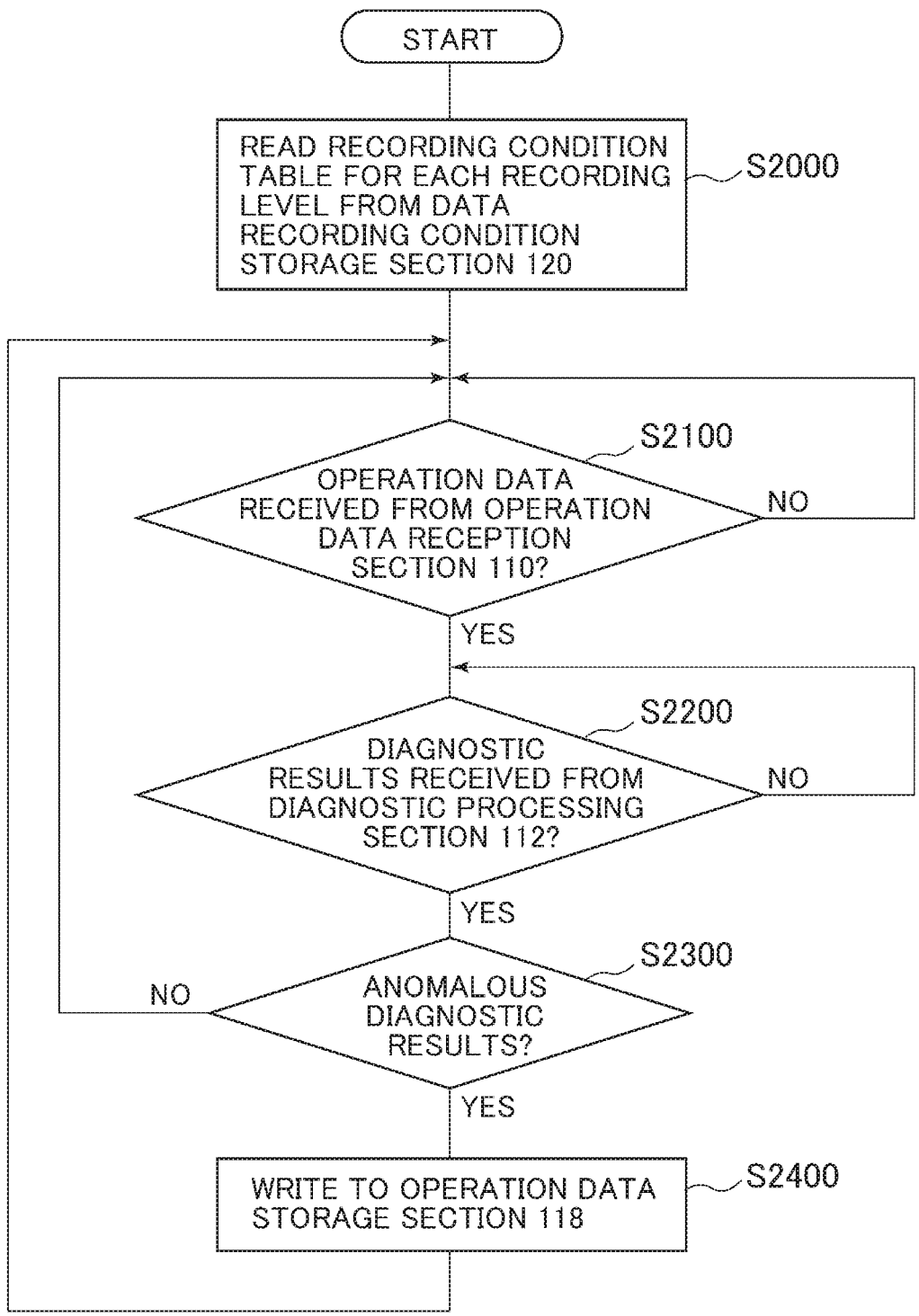
FIG. 12 is a flowchart illustrating details of steps handled by a data recording processing section in the embodiment of the operation data collection device for work machines of the present invention.
Figure 13:
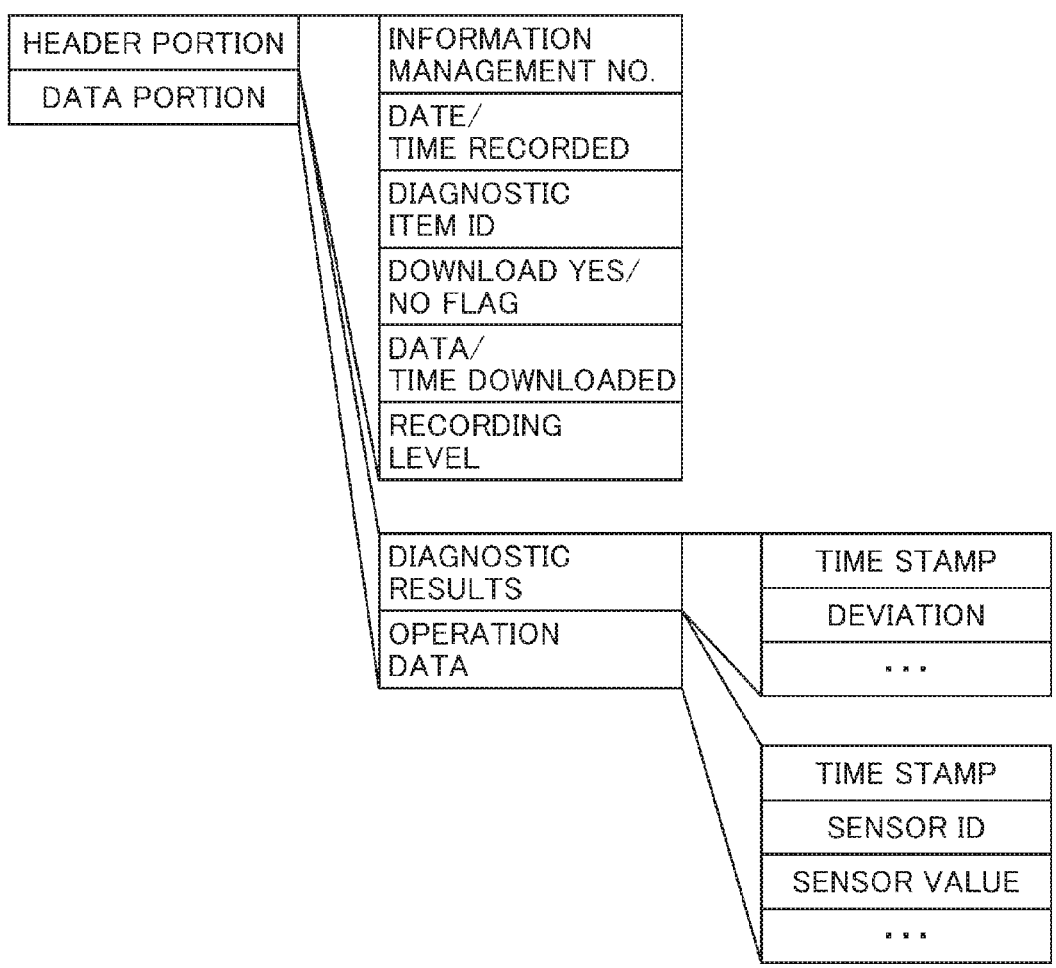
FIG. 13 is a table illustrating an example of organization of information stored in an operation data storage section in the embodiment of the operation data collection device for work machines of the present invention.

A detailed description will be given next of the details of the processing performed by the operation data collection device 100 with reference to the drawings. FIG. 6 is a table illustrating an example of organization of operation data in the embodiment of the operation data collection device for work machines of the present invention. FIG. 7 is a table illustrating an example of systems making up a work machine and organization of sensor information of the work machine to which the embodiment of the operation data collection device for work machines of the present invention is applied. FIG. 8 is a table illustrating an example of information stored in the diagnostic condition storage section in the embodiment of the operation data collection device for work machines of the present invention. FIG. 9 is a flowchart illustrating details of steps handled by the diagnostic processing section in the embodiment of the operation data collection device for work machines of the present invention. FIG. 10 is a table illustrating an example of a recording condition table that includes a recording condition for each recording level stored in the data recording condition storage section in the embodiment of the operation data collection device for work machines of the present invention. FIG. 11A is a characteristic chart illustrating a relationship between a recording level and a recordable remaining space of the data recording condition storage section in the embodiment of the operation data collection device for work machines of the present invention. FIG. 11B is a characteristic chart illustrating a relationship between the recording level of the data recording condition storage section and number of days elapsed from the date of data recording in the embodiment of the operation data collection device for work machines of the present invention. FIG. 12 is a flowchart illustrating details of steps handled by the data recording processing section in the embodiment of the operation data collection device for work machines of the present invention. FIG. 13 is a table illustrating an example of organization of information stored in the operation data storage section in the embodiment of the operation data collection device for work machines of the present invention. FIG. 14 is a flowchart illustrating details of steps handled by the recorded data change processing section in the embodiment of the operation data collection device for work machines of the present invention.

The operation data reception section 110 is connected to the engine monitoring device 13 and the hydraulic monitoring device 23 via the communication line illustrated in FIG. 2 to receive operation data of a variety of sensors as state quantities for each part/system.

FIG. 6 illustrates an example of organization of operation data received by the operation data reception section 110 from the work machine 1. Operation data includes a message body and a reception date and time of the message. The message body includes a set of a part/system ID, a sensor ID, and a sensor value. The reception date and time is measured by an unshown internal clock of the operation data collection device 100. Here, the part/system ID is used to identify the part/system attached to the target sensor. The sensor ID is used to uniquely identify the target sensor from among those attached to the target part/system. The sensor value represents the measured value of the only sensor identified by the part/system ID and the sensor ID.

FIG. 7 illustrates an example of main components of the work machine and organization of sensor information thereof. As illustrated in FIG. 7, among parts/systems are the engine intake system, the engine exhaust system, the engine cooling system, and the hydraulic fluid cooling system. "m1," "m2," "m3," "m4," and so on are assigned to the respective part/system IDs. Further, sensors are attached to each part/system to measure a plurality of physical quantities to check the operating states.

For example, intercooler inlet temperature, intercooler inlet pressure, intercooler outlet temperature, and intercooler outlet pressure sensors are attached to the engine intake system (m1), with "T1," "P1," "T2," and "P2" assigned respectively to these sensors as sensor IDs. This makes it possible to uniquely identify a target sensor based on a combination of a part/system ID and a sensor ID as far as the sensors attached to the work machine 1 are concerned.

A description will be given next of information stored in the diagnostic condition storage section 114 with reference to FIG. 8. The diagnostic condition storage section 114 stores diagnostic item information used for diagnostic processing performed by the diagnostic processing section 112. Here, the term "diagnostic item" refers to an item relating to a faulty event for each part to be diagnosed. Each of such parts is diagnosed independently to detect a faulty condition.

As illustrated in FIG. 8, as for diagnostic item information, for example, engine and hydraulic system are stored as parts to be diagnosed, with faulty cooling water system, faulty intake system, and faulty exhaust system stored as details of diagnosis. Further, faulty hydraulic fluid cooling is stored as details of diagnosis for the hydraulic system.

Still further, time intervals for performing diagnostic processing for each diagnostic item are stored as intervals for diagnostic processing. As input sensor items, input sensor items used to detect a faulty condition for each diagnostic item, and normal mean and normal variance for each operation mode, are stored. FIG. 8 shows normal mean and normal variance for each operation mode when the engine is diagnosed and when the details of diagnosis are faulty intake system. How diagnosis is performed using these pieces of information will be described in detail later where content of the diagnostic processing section 112 is described.

A description will be given next of details of processing performed by the diagnostic processing section 112 of the operation data collection device 100 with reference to FIG. 9.

The diagnostic processing section 112 reads a diagnostic condition (diagnostic item information) from the diagnostic condition storage section 114 (step S1000).

The diagnostic processing section 112 checks whether operation data has been received from the operation data reception section 110 (step S1100). Here, if operation data has yet to be received, the judgment is no. In this case, the diagnostic processing section 112 returns to step S1000 to check again whether operation data has been received. When operation data has been received from the operation data reception section 110, the judgment is yes. In this case, the diagnostic processing section 112 proceeds to step S1200.

When the judgment is, yes in step S1100, the diagnostic processing section 112 performs steps S1200 and S1300 for each of the diagnostic items given in the diagnostic conditions shown in FIG. 8 and stored in the diagnostic condition storage section 114.

The diagnostic processing section 112 calculates the divergence (step S1200). How to calculate the divergence will be described below.

N pieces of input sensor data for a diagnostic item are denoted by $d_1(t)$, $d_2(t)$, and so on up to $d_N(t)$. Further, letting a normal mean and a normal variance of a sensor i in operation mode m (m=1, 2, and so on up to M) stored in the diagnostic condition storage section 114 shown in FIG. 8 be denoted by $\mu_{mi}$ and $\sigma_{mi}$, respectively, the divergence L(t,m) in each operation mode is calculated by formula 1 shown below.

$$L(t, m) = \sqrt{\sum_{i=1}^{N} \left(\frac{d_i(t) - \mu_{mi}}{\sigma_{mi}}\right)^2} \qquad \text{[Formula 1]}$$

Then, the minimum divergence $m=m(L_{min})$ of all the divergences L(t,m)(m=1, 2, . . . , M) in M operation modes is identified anew as an operation mode next. The divergence at this time is adopted as the divergence L(t) at time t. This divergence is a calculated deviation of sensor data to be diagnosed from the center of the normal reference values and expressed as a ratio to the normal variance. Assuming a normal distribution, therefore, it is possible to judge that a divergence of 3 or more is faulty, and that a divergence of less than 3 is normal.

Further, it is possible to calculate which one of the N pieces of sensor data $d_1(t)$, $d_2(t)$, and so on up to $d_N(t)$ to be diagnosed contributes the most to the divergence L(t). This allows for identification of the sensor that contributes the most to a faulty condition in a model composed of a plurality of sensors, thus estimating the cause of the faulty condition.

Referring back to FIG. 9, the diagnostic processing section 112 outputs, to the data recording processing section 116, the calculation result of the divergence L(t) at time t calculated for each diagnostic result (step S1300).

At the completion of step S1300, the diagnostic processing section 112 returns to step S1100 again to receive operation data.

Referring back to FIG. 5, a description will be given of processing performed by the data recording processing section 116. The data recording processing section 116 identifies whether any faulty condition has occurred for each of the diagnostic items based on the diagnostic results received from the diagnostic processing section 112. Then, the data recording processing section 116 records, in the operation data storage section 118, diagnostic results and operation data received from the operation data reception section 110 only when a faulty condition occurs. At this time, the data recording processing section 116 reads a recording condition for operation data, information stored in the data recording condition storage section 120, writing operation data in accordance with the condition.

Here, the data recording condition storage section 120 stores approximately three kinds of information: (1) recording condition tables, one for each recording level; (2) information about recording level in accordance with the recordable remaining space of the operation data storage section 118; and (3) information about recording level in accordance with number of days elapsed from the date of data recording. Here, the term "recording level" refers to a level that relates to an amount of recorded information having, as parameters, sensor items to be recorded and a time window width.

The data recording processing section 116 records operation data by referring to the (1) recording condition tables, one for each recording level. The other two kinds of information are referred to by the data change processing section 122 which will be described later.

FIG. 10 illustrates an example of a recording condition table that includes a recording condition for each recording level stored in the data recording condition storage section 120. This recording condition table with a recording condition for each recording level contains a recording time window width and sensor items that are specified for each recording level for each diagnostic item. Here, the term "recording time window width" refers to a time width for recording operation data relative to the time of occurrence of a faulty condition, and the term "sensor item" refers specifically to what is recorded. That is, it is possible to adjust the amount of information by reflecting the time window width and the sensor items of each recording level in operation data recording.

A description will be given next of details of processing performed by the data recording processing section 116 of the operation data collection device 100 with reference to FIG. 12.

The data recording processing section 116 reads the recording condition table for each recording level from the data recording condition storage section 120 (step S2000). Here, level 3 information (recording time window width and sensor IDs) are referred to as a recording level for each diagnostic item. The data recording processing section 116 performs processing based on this level 3 information, and not processing based on information of other level, at the stage of writing in step S2400 which will be described later.

The data recording processing section 116 checks whether operation data has been received from the operation data reception section 110 (step S2100). Here, if operation data has yet to be received, the judgment is no. In this case, the data recording processing section 116 returns to step S2100 to check again whether operation data has been received. When operation data has been received from the operation data reception section 110, the data recording processing section 116 buffers the largest recording time window width worth of operation data of all the widths for each diagnostic item for recording level 3 read at least in step S2000. At the same time, the judgment is yes, and the data recording processing section 116 proceeds to step S2200.

After confirming the reception of operation data from the operation data reception section 110, the data recording processing section 116 checks whether diagnostic results have been received from the diagnostic processing section 112 (step S2200). Here, if diagnostic results have yet to be received, the judgment is no. In this case, the data recording processing section 116 returns to step S2200 to check again whether diagnostic results have been received. When diagnostic results have been received from the diagnostic processing section 112, the judgment is yes. In this case, the data recording processing section 116 proceeds to step S2300.

The data recording processing section 116 judges whether the diagnostic results are faulty (step S2300). More specifically, the data recording processing section 116 checks the divergence among the diagnostic results for each diagnostic item received from the diagnostic processing section 112, judging whether the divergence is 3 or more. Here, the data recording processing section 116 judges that the diagnostic results are faulty if the divergence is 3 or more. In this case, the judgment is yes, and the data recording processing section 116 proceeds to step S2400. When the divergence is less than 3, the data recording processing section 116 judges that the diagnostic results are normal. In this case, the judgment is no, and the data recording processing section 116 returns to step S2100 again to receive new operation data.

If the data recording processing section 116 judges that the diagnostic results are faulty in step S2300, the data recording processing section 116 writes (records) data into the operation data storage section 118 (step S2400).

Data recorded in the operation data storage section 118 here is diagnostic results (divergence) for the diagnostic item that has been judged faulty and operation data of the sensor items (sensor IDs) specified for recording level 3 for the diagnostic item in question. Moreover, another piece of data recorded is operation data for the length of time specified as a recording time window width specified for recording level 3. This recording time window width indicates that "(recording time window width)/2" worth of operation data, stretching backward into the past and forward into the future from the time of occurrence of the faulty condition, is recorded. Therefore, only the operation data of the sensor ID specified for recording level 3 is extracted from the buffered operation data, and only the "(recording time window width)/2" worth of data is recorded. Then, operation data of the same sensor ID is successively and unconditionally recorded in the operation data storage section 118 until the length of time equal to the "(recording time window width)/2" elapses.

FIG. 13 illustrates an example of information recorded in the operation data storage section 118 by the data recording processing section 116. As illustrated in FIG. 13, information recorded in the operation data storage section 118 can be broadly classified into two parts, namely, a header part and a data part. The header part stores an information management number, a recording date and time, a diagnostic item ID, a download yes/no flag, a download date and time, and a recording level. On the other hand, the data part stores diagnostic results and operation data. Diagnostic results store a time stamp and a divergence. Operation data stores a time stamp, a sensor ID, and a sensor value.

A block made up of the header part and the data part shown in FIG. 13 is referred to as a record. Each record has a unit of writing for a single occurrence of a faulty condition for each diagnostic item. It should be noted, however, that if faulty conditions occur successively, these successive faulty conditions are counted as a single faulty condition. That is, if the data recording processing section 116 detects successive faulty conditions for a diagnostic item, one record consists of "(recording time window width)/2" worth of operation data before the occurrence of a faulty condition for the sensor ID specified in the recording condition table for recording level 3, the duration of the faulty condition worth of operation data, and "(recording time window width)/2" worth of operation data after the end of the faulty condition.

The information management number of the header part shown in FIG. 13 is used to uniquely identify the record in question. Further, the recording date and time of the header part is the date and time indicated by the internal clock of the operation data collection device 100 when the recording of the record in question began. The diagnostic item ID stores the ID for which a faulty condition was detected. The download yes/no flag stores "no" at the time of writing by the data recording processing section 116, with "NULL" stored in the download date and time. Then, the recording level stores "3" at the time of writing by the data recording processing section 116.

The diagnostic results of the data part shown in FIG. 13 store results whose divergence is 3 or more together with a time stamp. Here, the time stamp reflects the date and time of reception of operation data and stores the date and time of reception of the operation data used for diagnostic processing.

Referring back to FIG. 5, a description will be given of details of operation of the operation data collection device 100 when a data download request is received from the external server 200.

The processing performed by the data recording processing section 116 will be described. Upon receipt of a request to download operation data and diagnostic results from the external server 200, the communication processing section 126 of the operation data collection device 100 searches the operation data storage section 118 for requested data and transmits the data to the external server 200. Here, data requested for download is in units of a record that contains a package of a header part and a data part recorded in the operation data storage section 118.

At the completion of transmission of a record of data, the communication processing section 126 transmits the information management number, recorded in the header part of the transmitted record, to the access history management section 124. Upon receipt of the information management number, the access history management section 124 accesses the header part of the record having the information management number in question in the operation data storage section 118, changing the download flag from "no" to "yes" and recording the download date and time based on the internal clock of the operation data collection device 100.

At this time, if the download flag is already "yes," the access history management section 124 may leave the flag unchanged. On the other hand, if data was downloaded before according to the download dates and times, the most recent download date and time is recorded.

A description will be given next of details of operation when the operation data collection device 100 receives an update information file of the data recording condition storage section 120 from the external server 200.

Upon receipt of the update information file of the data recording condition storage section 120, the communication processing section 126 transmits the update information file to the update processing section 130.

The update processing section 130 updates, based on the content of the update information file, the recording condition table for each recording level stored in the data recording condition storage section 120, information about the recording level appropriate to the recordable remaining space of the operation data storage section 118, and information about the recording level appropriate to the number of days elapsed from the date of data recording.

A description will be given next of details of processing performed by the data change processing section 122 of the operation data collection device 100 with reference to FIG. 14.

The data change processing section 122 reads information from the data recording condition storage section 120 (step S3000). In contrast to the data recording processing section 116 that refers only to the recording condition table, which is one of the information stored in the data recording condition storage section 120, for each recording level, the data change processing section 122 additionally refers to two other pieces of information stored in the data recording condition storage section 120, namely, information about the recording level appropriate to the recordable remaining space of the operation data storage section 118, and information about the recording level appropriate to the number of days elapsed from the date of data recording.

Here, FIG. 11A illustrates information about the recording level appropriate to the recordable remaining space of the operation data storage section 118 stored in the data recording condition storage section 120. FIG. 11B illustrates information about the recording level appropriate to the number of days elapsed from the date of data recording stored in the data recording condition storage section 120. These pieces of information are setting information used to change the recording level in accordance with the free space and the freshness of information for each record recorded in the operation data storage section 118.

Information about the recording level appropriate to the recordable remaining space is setting information used to change the recording level of a record that has yet to be downloaded in accordance with the ratio of the free space to the total space of the operation data storage section 118. As illustrated in FIG. 11A, for example, the recording level is changed from "3" to "2" when the free space falls below 80%, and from "2" to "1" when the free space falls below 60%. Then, the recording level is changed from "1" to "0" when the free space falls below 20%.

On the other hand, information about the recording level appropriate to the number of days elapsed from the date of data recording is setting information used to change the recording level of a record recorded in the operation data storage section 118 that has yet to be downloaded in accordance with the number of days elapsed from the date of data recording. As illustrated in FIG. 11B, for example, the recording level is changed from "3" to "2" when a month elapses from the date of data recording, and from "2" to "1" when two months elapse from the date of data recording. Then, the recording level is changed to "0" when three months elapse from the date of data recording.

Referring back to FIG. 14, the data change processing section 122 reads information from the data recording condition storage section 120 in step S3000 first, and then calculates the free space of the operation data storage section 118, thus calculating the ratio of the free space to the total space (step S3100). Here, in the calculation of the free space of the operation data storage section 118, the records already downloaded are also counted as recordable space.

The data change processing section 122 calculates the ratio of the free space of the operation data storage section 118 in step S3100 first, and then performs the steps from step S3200 onward for each record recorded in the operation data storage section 118.

The data change processing section 122 determines whether the record in question has been downloaded (step S3200). More specifically, the data change processing section 122 refers to the download yes/no flag in the header part of the target recorded record to check whether the record has been downloaded. Here, when the download yes/no flag is "yes," the judgment is yes. In this case, the steps for the recorded record in question are terminated. On the other hand, if the download yes/no flag is "no," the judgment is no. In this case, the data change processing section 122 proceeds to step S3300.

The data change processing section 122 calculates, with a recorded record whose download yes/no flag is "no," the number of days elapsed from the date and time of record recording (step S3300). More specifically, the data change processing section 122 refers to the date and time of recording of the header part of the target record and acquires the current date and time based on the internal clock of the operation data collection device 100. Then, the data change processing section 122 subtracts the date and time of recording from the current date and time to calculate the number of days elapsed.

The data change processing section 122 calculates the recording level of the record in question (step S3400). More specifically, the data change processing section 122 calculates the recording level to change to based on the ratio of the free space of the operation data storage section 118 calculated in step S3100, the number of days elapsed from the date of record recording calculated in step S3300, and information read in step S3000 from the data recording condition storage section 120.

The data change processing section 122 calculates recording levels based on following information: information about the recording level appropriate to the recordable remaining space of the operation data storage section 118 stored in the data recording condition storage section 120 illustrated in FIG. 11A; and information about the recording level appropriate to the number of days elapsed from the date of data recording illustrated in FIG. 11B. The data change processing section 122 adopts the larger of the two recording levels calculated.

The data change processing section 122 determines whether the recording level adopted in step S3400 matches that stored in the header part of the target recorded record (step S3500). Here, when the two recording levels match, the judgment is yes. In this case, the steps for the recorded record in question are terminated. On the other hand, if the two recording levels do not match, the judgment is no. In this case, the data change processing section 122 proceeds to step S3600.

If it is determined that the two recording levels do not match in step S3500, the data change processing section 122 changes the recorded data (step S3600). More specifically, the data change processing section 122 changes the recording level of the header part to a new level found. Then, the data change processing section 122 extracts the sensor ID and the recording window width for the target recording level from among the recording conditions for the respective recording levels stored in the data recording condition storage section 120 based on the diagnostic item ID of the header part and the new recording level. Then, the data change processing section 122 changes the recorded information of the operation data in the data part based on the above pieces of information.

When the recording level declines, the sensor ID is changed to a smaller one. Therefore, the data change processing section 122 deletes the operation data of the sensor ID that was not extracted. Further, the recording window width is changed to a narrower one. Therefore, the data change processing section 122 deletes the recorded data before and after the recording window width.

When step S3600 is terminated, the steps from step S3200 onward are performed for a next recorded record. When the steps for all the recorded records are terminated, the data change processing section 122 returns to step S3100.

The above embodiment of the operation data collection device for work machines of the present invention adjusts the extent and intervals for recording collected operation data in accordance with the download status, the free space of the operation data storage section, and the freshness of operation information. This ensures savings in storage capacity while at the same time preserving important operation data that has yet to be verified even when the frequency of access diminishes. This makes it possible to detect faulty conditions promptly through diagnosis of signs, accurately and proactively avoiding failures that could disturb continuous operation for enhanced productivity in work machines.

It should be noted that the present invention is not limited to the above embodiment and includes various modification examples. For example, the above embodiment has been described in detail for easy understanding of the present invention, and the present invention is not necessarily limited to an embodiment including all the components described. Further, each of the components, functions, processing sections, processing means, and so on may be partially or wholly implemented by hardware, for example, by designing it in the form of an integrated circuit. Alternatively, each of the components, functions, and so on may be implemented by software, for example, by a processor interpreting and executing a program that implements each of the functions.

DESCRIPTION OF THE REFERENCE NUMERALS

1: Work machine
2: Travel structure
3: Swing structure
4: Cab
5: Front work device
6: Boom
7: Arm
8: Bucket
9: Controller network
10: Engine control device
11: Engine
12: Injection amount control device
13: Engine monitoring device
14: Keypad
15: Electric lever for operating travel structure
16: Electric lever for operating front work device 17: Electric lever control device
18: Display
19: Display control device
20: Engine intake/exhaust system sensors
22: Engine cooling water system sensors
23: Hydraulic monitoring device
24: Hydraulic fluid cooling system sensors
25: Main pump
26: Pump transmission
27: Actuator
28: Control valve
30: Pilot pump
31: Pilot reducing valve
33: Oil cooler
34: Hydraulic fluid tank
36: Oil cooler cooling fan
37: Oil cooler fan drive motor
38: Oil cooler fan drive pump
45: Cooling water pump
46: Radiator
47: Radiator inlet pipe
48: Radiator outlet pipe
54: Radiator cooling fan drive motor
58: Radiator cooling fan
65: Air cleaner
66: Turbo
67: Intercooler
68: Intercooler inlet pipe
69: Intercooler outlet pipe
70: Cylinders
71: Exhaust pipe
72: Muffler
100: Operation data collection device
102: Antenna
110: Operation data reception section
112: Diagnostic processing section
114: Diagnostic condition storage section
116: Data recording processing section
118: Operation data storage section
120: Data recording condition storage section
122: Data change processing section
124: Access history management section
126: Communication processing section
130: Update processing section
200: Server

The invention claimed is:

1. An operation data collection device for work machines having a plurality of sensors attached to a work machine, the operation data collection device receiving measurement data of the sensors as operation data to record the operation data in an operation data storage section, the operation data collection device comprising:

a communication processing section that transmits the operation data stored in the operation data storage section to an external server in response to a download request from the external server;

an access history management section that manages a download status of the operation data recorded in the operation data storage based on the download request from the external server and the transmission of the operation data to the external server; and a data recording condition storage section that stores information including respective recording levels indicating an amount of recorded information; and, a recorded data change processing section that changes a recording level for the operation data that is recorded in the operation data storage section and that is yet to be downloaded to the external server, based on the information stored in the data recording condition storage section, wherein the data recording condition storage section is configured to store:

recording condition tables for every recording level, each recording condition table including sensor items and a recording time window width that are specified for each recording level;

first information indicating a recording level base on a recordable remaining space of the operation data storage section; and second information indicating a recording level based on a number of days elapsed from a recording date of the operating data, and wherein the recorded data change processing section is configured to:

calculate a first recording level for the yet to be downloaded operation data in accordance with the recordable remaining space of the operation data storage section based on the first information stored in the data recording condition storage section;

calculate a second recording level for the yet to be downloaded operation data in accordance with the number of days elapsed from the recording date of the yet to be downloaded operation data in the operation data storage section based on the second information stored in the data recording condition storage section;

change the recording level of the yet to be downloaded operation data to the greater of the first and second recording levels;

extract information including sensor items and a recording window width from the recording condition table for the changed recording level stored in the data recording condition storage section; and change the recorded information of the yet to be downloaded operation data based on the extracted information.

2. The operation data collection device for work machines according to claim 1 comprising:

a diagnostic processing section that diagnoses the operating state of a plurality of components of the work machine on the basis of the operation data; and a data recording processing section configured to identify an occurrence of a faulty condition on the basis of results of diagnosis made by the diagnostic processing section, and record the operation data in the operation data storage section only for a given period of time including the time of occurrence of the faulty condition when the data recording processing section identified an occurrence of a faulty condition.

3. The operation data collection device for work machines according to claim 2, wherein the plurality of components of the work machine include engine systems and hydraulic systems.

* * * * *